(12) United States Patent
Gheorghiu

(10) Patent No.: US 9,240,158 B2
(45) Date of Patent: Jan. 19, 2016

(54) METHOD AND APPARATUS FOR PROGRAM UTILIZATION OF DISPLAY AREA

(71) Applicant: Nokia Corporation, Espoo (FI)

(72) Inventor: Catalin Gheorghiu, Helsinki (FI)

(73) Assignee: Nokia Technologies OY, Espoo (FI)

( * ) Notice: Subject to any disclaimer, the term of this patent is extended or adjusted under 35 U.S.C. 154(b) by 71 days.

(21) Appl. No.: 13/903,964

(22) Filed: May 28, 2013

(65) Prior Publication Data

US 2014/0354530 A1    Dec. 4, 2014

(51) Int. Cl.
*G09G 5/00* (2006.01)
*G06F 3/14* (2006.01)
*G09G 5/14* (2006.01)

(52) U.S. Cl.
CPC .............. *G09G 5/003* (2013.01); *G06F 3/1423* (2013.01); *G09G 5/14* (2013.01); *G09G 2310/0221* (2013.01); *G09G 2330/022* (2013.01); *G09G 2340/145* (2013.01); *G09G 2370/16* (2013.01)

(58) Field of Classification Search
CPC combination set(s) only.
See application file for complete search history.

(56) References Cited

U.S. PATENT DOCUMENTS

| 2008/0224948 | A1  | 9/2008  | Alberth       |         |
|--------------|-----|---------|---------------|---------|
| 2010/0058205 | A1  | 3/2010  | Vakil et al.  |         |
| 2012/0075166 | A1* | 3/2012  | Marti et al.  | 345/1.1 |
| 2012/0242599 | A1* | 9/2012  | Seo et al.    | 345/173 |
| 2012/0299813 | A1* | 11/2012 | Kang et al.   | 345/156 |
| 2012/0299845 | A1* | 11/2012 | Seo et al.    | 345/173 |
| 2012/0306782 | A1* | 12/2012 | Seo et al.    | 345/173 |
| 2012/0313862 | A1  | 12/2012 | Ko et al.     |         |
| 2013/0076782 | A1* | 3/2013  | Sirpal et al. | 345/619 |
| 2013/0215011 | A1* | 8/2013  | Ke            | 345/156 |
| 2013/0265221 | A1* | 10/2013 | Lee et al.    | 345/156 |
| 2013/0271365 | A1* | 10/2013 | Tziortzis et al. | 345/156 |
| 2013/0300682 | A1* | 11/2013 | Choi et al.   | 345/173 |

FOREIGN PATENT DOCUMENTS

| EP | 2674834 A2    | 12/2013 |
|----|---------------|---------|
| WO | 2012108668 A2 | 8/2012  |

OTHER PUBLICATIONS

International Search Report and Written Opinion of the International Searching Authority received in Patent Cooperation Treaty Application No. PCT/FI2014/050339, 12 pages.

* cited by examiner

*Primary Examiner* — Jason Olson
*Assistant Examiner* — Deeprose Subedi
(74) *Attorney, Agent, or Firm* — Banner & Witcoff, Ltd.

(57) ABSTRACT

A method comprising determining that an apparatus is in a partial display physical configuration, receiving an indication of an input that identifies a program to operate in a greater display physical configuration, determining that the apparatus has become configured in the greater display physical configuration, and causing the program to utilize at least part of a display area and at least part of another display area is disclosed.

20 Claims, 10 Drawing Sheets

METHOD AND APPARATUS FOR PROGRAM UTILIZATION OF DISPLAY AREA

TECHNICAL FIELD

The present application relates generally to program utilization of a display area.

BACKGROUND

As electronic apparatuses have expanded their capabilities, as well as the number and types of operations they perform, interaction has become increasingly complex and time consuming. For example, apparatus interaction may be prone to errors, confusion, and delay. In some circumstances, a user may miss an opportunity to do something, such as capture an image of an event, due to delays associated with interaction. In other circumstances, a user may avoid utilizing an apparatus capability due to a desire to avoid errors, confusion, or delay. Under such circumstances, it may be desirable for a user to interact with the electronic apparatus in a simple, quick, and intuitive manner.

SUMMARY

Various aspects of examples of the invention are set out in the claims.

One or more embodiments may provide an apparatus, a computer readable medium, a non-transitory computer readable medium, a computer program product, and a method for determining that an apparatus is in a partial display physical configuration associated with a display area of a display being viewable to a user, receiving an indication of an input that identifies a program to operate in a greater display physical configuration associated with the display area and another display area of the display being viewable to the user, determining that the apparatus has become configured in the greater display physical configuration, and causing the program to utilize at least part of the display area and at least part of the other display area based, at least in part, on the input and the determination that the apparatus has become configured in the greater display configuration.

One or more embodiments may provide an apparatus, a computer readable medium, a computer program product, and a non-transitory computer readable medium having means for determining that an apparatus is in a partial display physical configuration associated with a display area of a display being viewable to a user, means for receiving an indication of an input that identifies a program to operate in a greater display physical configuration associated with the display area and another display area of the display being viewable to the user, means for determining that the apparatus has become configured in the greater display physical configuration, and means for causing the program to utilize at least part of the display area and at least part of the other display area based, at least in part, on the input and the determination that the apparatus has become configured in the greater display configuration.

In at least one example embodiment, the display area relates to a part of the display that is facing the user in the partial display physical configuration, and the other display area relates to a part of the display that does not face the user in the partial display physical configuration.

In at least one example embodiment, the other display area relates to a part of the display that faces the user in the greater display physical configuration.

In at least one example embodiment, a display area facing the user relates to the display being at a desirable viewing angle to the user.

In at least one example embodiment, the partial display physical configuration relates to the display area and the other display area being substantially non-aligned, and the greater display physical configuration relates to the display area and the other display area being substantially aligned.

In at least one example embodiment, substantial alignment relates to a viewing angle of displays being substantially the same.

In at least one example embodiment, substantially the same relates to deviation being non-noticeable.

In at least one example embodiment, the display comprises a first display and a second display that are moveable with respect to each other, and determination that the apparatus has become configured in the greater display physical configuration relates to the first display and the second display being substantially aligned.

In at least one example embodiment, the display relates to a flexible display, the partial display physical configuration relates to the display being bent such that the other display area is not substantially aligned with the display area, and the greater display physical configuration relates to the display being, at least partially, non-bent such that the other display area is substantially aligned with the display area.

In at least one example embodiment, the input relates to a drag input towards a flexion of the display in the partial display physical configuration.

One or more example embodiments further perform determining that the input identifies the program to operate in the greater display physical configuration.

One or more example embodiments further perform determining that the apparatus has become configured in the partial display physical configuration, receiving an indication of another input that does not identify the program to operate in the greater display physical configuration, determining that the apparatus has become configured in the greater display physical configuration, and causing, at least temporarily, the program to utilize the display area without the other display area based, at least in part, on the other input.

In at least one example embodiment, causation of the program to utilize at least part of the display area and at least part of the other display area is performed absent consideration of another input.

In at least one example embodiment, causation of the program to utilize at least part of the display area and at least part of the other display area is performed absent receipt of another input.

In at least one example embodiment, the apparatus comprises a mechanical actuator configured to cause the apparatus to change physical configuration from the partial display physical configuration to the greater display physical configuration.

One or more example embodiments further perform causing actuation of the mechanical actuator to change the apparatus from the partial display physical configuration to the greater display physical configuration.

In at least one example embodiment, the causation of actuation is based, at least in part, on the input.

In at least one example embodiment, causation of actuation is performed absent consideration of another input.

In at least one example embodiment, causation of actuation is performed absent receipt of another input.

In at least one example embodiment, the mechanical actuator relates to at least one of a motor, a magnetorheological fluid, and electrorheological fluid, or a shape memory alloy.

In at least one example embodiment, the input relates to selection of a non-interactive representation of the program.

One or more example embodiments further perform launching the program.

In at least one example embodiment, launch of the program is based, at least in part, on the input and the determination that the apparatus has become configured in the greater display physical configuration.

In at least one example embodiment, the non-interactive representation of the program relates to at least one of an icon or a tile.

In at least one example embodiment, launching the program is performed absent consideration of another input.

In at least one example embodiment, launching the program is performed absent receipt of another input.

In at least one example embodiment, causation of the program to utilize at least part of the display area and at least part of the other display area comprises causing the program to utilize an entirety of the display area and an entirety of the other display area.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
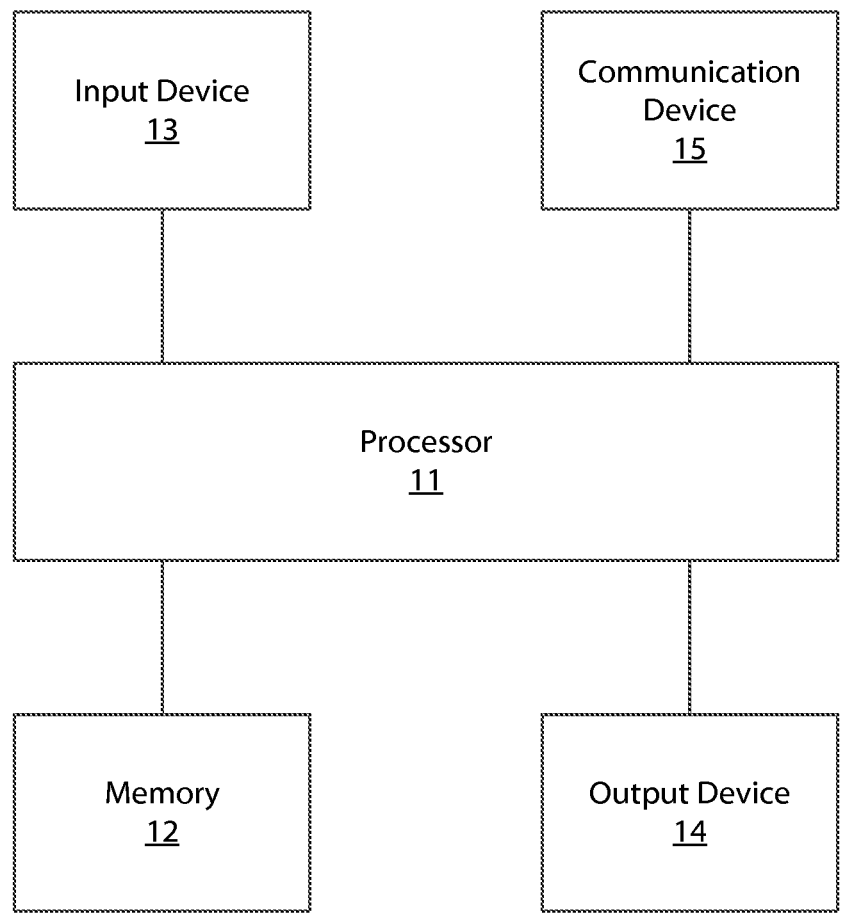
FIG. 1 is a block diagram showing an apparatus according to an example embodiment.

An embodiment of the invention and its potential advantages are understood by referring to FIGS. 1 through 8 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2E are diagrams illustrating physical configuration of an apparatus according to at least one example embodiment. The examples of FIGS. 2A-2E are merely examples of physical configurations of an apparatus, and do not limit the scope of the claims. For example, shape of the apparatus may vary, number of displays may vary, physical configurations may vary, and/or the like.

As electronic apparatuses have evolved to meet an increasing variety of user desires, the variety of user desires regarding their electronic apparatuses has grown as well. For example, many users rely on electronic apparatuses throughout their daily lives. For example, many users rely on having their electronic apparatus with them pervasively throughout their day. Many users carry their apparatus in their pocket, in their purse, on a belt, and/or the like. In this manner, many users desire their electronic apparatus to be as small as possible.

In another example, many uses have become reliant on their electronic apparatuses for performing increasingly complex tasks. For example, where in the past, a mobile phone may have been relegated to phone calls and messaging, many users desire to perform the same tasks on their mobile phones that the users perform on their laptop computers. Many of these tasks involve display of large amounts of information. For example, users may desire to view multiple programs at the same time, may desire to view large documents with embedded content, may desire to view large representations of information with many interactive elements, and/or the like. In this manner, many users desire a display to be as large as possible.

For, at least, the reason that many users simultaneously desire their apparatus to be as small as possible and desire their display to be as large as possible, users may desire to have an apparatus that may be configurable to be used in multiple physical configurations. For example, it may be desirable for an apparatus to be capable of being physically configured in a way that has small dimensions, for example dimensions small enough to be carried in a pocket, in a purse, on a belt, and/or the like. In this manner, users may have their desire for a small apparatus fulfilled. In such an example, it may be desirable for the apparatus to be capable of being physically configured in a way that provides a large display area. In this manner, users may have their desire for a large display fulfilled.

In at least one example embodiment, an apparatus is designed to be configured in one of a plurality of physical configurations. For example, there may be a physical configuration associated with a compact physical configuration and a small display area that faces a user. In such an example, there may be another physical configuration associated with a less compact physical configuration and a larger display area that faced the user. In some circumstances, it may be desirable for the display area of the compact physical configuration to be part of the display area of the less compact physical configuration. For example, it may be desirable for the larger display area to comprise the display area of the compact physical configuration and another display area that may be used in conjunction with the display area of the compact physical configuration to provide the larger display area. In this manner, the larger display area may be achieved by way of use of the smaller display area without necessarily requiring a separate large display.

In at least one example embodiment, a physical configuration relates to an independently stable arrangement of the apparatus. A physical configuration may be indecently stable by way of being configured to maintain the physical configuration without external stimulus, such as support from a user, a surface, and/or the like.

In at least one example embodiment, the apparatus is configurable to be in a partial display physical configuration. In at least one example embodiment, a partial display physical configuration relates to a physical configuration associated with a display area being viewable by the user and another display area being non-viewable by the user. For example, the other display area may be obscured by the apparatus, may face away from the user, may face in a direction that is not desirable for use by the user, and/or the like.

In at least one example embodiment, the apparatus is configurable to be in a greater display physical configuration. In at least one example embodiment, a greater display physical configuration relates to a physical configuration associated with the display area, which was viewable in the partial display physical configuration, being viewable by the user and, at least part of, the other display area, which was non-viewable in the partial display physical configuration, being viewable by the user. In at least one example embodiment, the greater display area physical configuration may relate to another different display area being non-viewable to a user. For example, the other different display area may be obscured by the apparatus, may face away from the user, may face in a direction that is not desirable for use by the user, and/or the like. In such an example, the apparatus may be designed to be configured in another greater display physical configuration in which, at least part of, the other different display area is viewable to the user.

In at least one example embodiment, the apparatus may be configurable in multiple different greater display physical configurations. For example, the multiple different greater display configurations may render different display areas to be viewable and/or non-viewable to the user. For example, the configurability of the apparatus may relate to a map fold display arrangement, an accordion fold arrangement, a rolled arrangement, and/or the like.

In at least one example embodiment, the greater display physical configuration relates to the display area, which is viewable in the partial display physical configuration, and the other display area, which is non-viewable in the partial display physical configuration, being substantially aligned. In at least one example embodiment, substantial alignment relates to a viewing angle of displays being substantially the same. Viewing angle may relate to an angle at which a user's gaze intersects the display. In at least one example embodiment, substantially the same relates to deviation being non-noticeable to a user. For example, if a deviation is within a just noticeable difference, the deviation may be non-noticeable to the user.

In at least one example embodiment, the partial display physical configuration relates to the display area and the other display area being substantially non-aligned. In at least one example embodiment, substantial non-alignment relates to a viewing angle of displays being substantially different. In at least one example embodiment, substantially different relates to deviation that alters the way a user views the display. For example, there may be a substantial difference if a deviation is to a degree that causes user difficulty, such as beyond a specified viewing angle for the display.

Figures 2A, 2B:
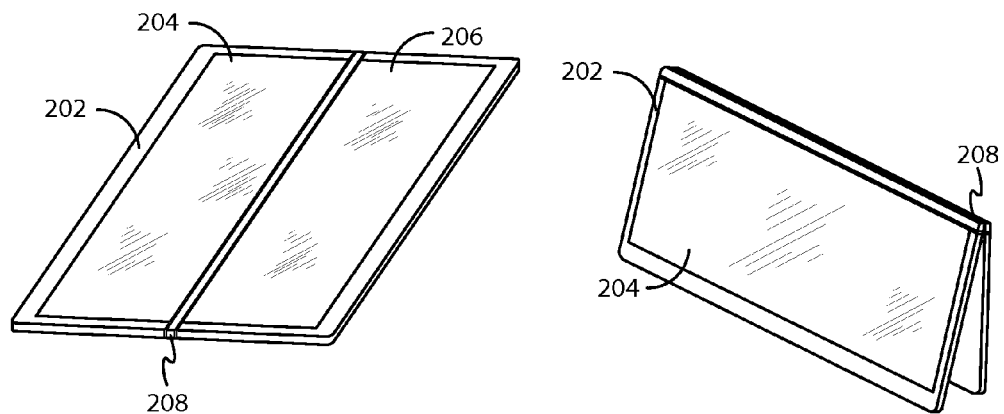
FIGS. 2A-2E are diagrams illustrating physical configuration of an apparatus according to at least one example embodiment.

In at least one example embodiment, an apparatus, such as apparatus 202 of FIGS. 2A and 2B, comprises a display that comprises a first display and a second display that are moveable with respect to each other. In at least one example embodiment, the first display relates to the display area, which is viewable by the user in the partial display physical configuration. In at least one example embodiment, the second display relates to, at least part of, the other display area, which is non-viewable in the greater display physical configuration. In at least one example embodiment, the moveable attachment may relate to a slide, a hinge, and/or the like. In at least one example embodiment, the first display and the second display are adjacent to each other in the greater display physical configuration. In at least one example embodiment, the edge of the first display that is closest to the second display in the greater display physical configuration relates to a flexion of the display. In at least one example embodiment, a flexion of a display relates to a part of a display that is indicative of a transition from a display area that is viewable in a physical configuration and another display area that is non-viewable in the physical configuration, but viewable in a different physical configuration. In at least one example embodiment, the greater display physical configuration relates to the first display and the second display being substantially aligned. In at least one example embodiment, substantial alignment relates to alignment that allows a user to interact with the first display and the second display together as an inclusive display.

In at least one example embodiment, the apparatus comprises a flexible display. In such an example, the partial display physical configuration may relate to the display being bent such that the other display area, which is non-viewable in the partial display physical configuration, is not substantially aligned with the display area, which is viewable in the partial display physical configuration. In such an example, the greater display physical configuration may relate to the display being, at least partially, non-bent such that the other display area is substantially aligned with the display area. In at least one example embodiment, a region on the display that is bent relates to a flexion of the display.

In at least one example embodiment, the apparatus determines a physical configuration in which the apparatus is configured. For example, the apparatus may determine that the apparatus is in a partial display physical configuration, in a greater display physical configuration, in a different greater display configuration, in a full display physical configuration, and/or the like. Similarly, the apparatus may determine that the apparatus has transitioned from a physical configuration to a different physical configuration. For example, the apparatus, may determine that the apparatus has become configured in a partial display physical configuration, in a greater display physical configuration, in a different greater display configuration, in a full display physical configuration, and/or the like.

The apparatus may utilize one or more sensors to determine the configuration of the apparatus. For example, the apparatus may use one or more proximity sensor, one or more rotational sensors, one or more orientation sensors, one or more strain sensors, and/or the like. For example, the apparatus may determine one or more angles between two or more displays that comprise the display of an apparatus. In another example, the apparatus may determine how much a flexible display is bent.

In at least one example embodiment, the apparatus may cause itself to transition from a physical configuration to a different physical configuration. For example, the apparatus may comprise a mechanical actuator. The mechanical actuator may be configured to cause the apparatus to change physical configuration from the partial display physical configuration to the greater display physical configuration. In at least one example embodiment, the mechanical actuator relates to a motor, a magnetorheological fluid, and electrorheological fluid, a shape memory alloy, and/or the like.

FIG. 2A is a diagram illustrating a physical configuration of an apparatus according to at least one example embodiment. In the example of FIG. 2A, apparatus 202 comprises a display that includes display 204 and display 206. In this manner, display 204 may relate to a display area and display 206 may relate to another display area. It can be seen that display 204 and display 206 are substantially aligned. In this manner, the display area and the other display area are substantially aligned. In the example of FIG. 2A, the physical configuration of apparatus 202 may relate to a greater display physical configuration. For example, the physical configuration of apparatus 202 illustrated in FIG. 2A may provide a greater amount of viewable display area than the physical configuration of FIG. 2B. In the example, of FIG. 2A, display 204 and display 206 are moveable with respect to each other. For example, the apparatus may flex at hinge 208. Apparatus 202 may determine that apparatus 202 has become configured in the greater display physical configuration based, at least in part, on determination that display 204 and display 206 are substantially aligned. For example, the other display areas of display 204 and display 206 relate to parts of the display that may face a user. In at least one example embodiment, the right edge of display 204 may relate to a flexion of the display. In at least one example embodiment, the left edge of display 206 may relate to a flexion of the display. In at least one example embodiment, the example of FIG. 2A illustrates a full display physical configuration of apparatus 202.

FIG. 2B is a diagram illustrating a physical configuration of an apparatus according to at least one example embodiment. In the example of FIG. 2B, it can be seen that display 204 and display 206 are substantially non-aligned. In this manner, the display area of display 204 and the other display area, which relates to display 206, are substantially non-aligned. In the example of FIG. 2B, the physical configuration of apparatus 202 may relate to a partial display physical configuration. For example, the physical configuration of apparatus 202 illustrated in FIG. 2B may provide a lesser amount of viewable display area than the physical configuration of FIG. 2A. Apparatus 202 may determine that apparatus 202 has become configured in the partial display physical configuration based, at least in part, on determination that display 204 and display 206 are substantially non-aligned.

Figure 2C:
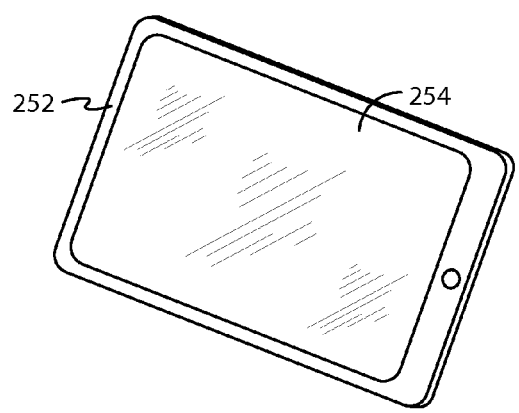

FIG. 2C is a diagram illustrating a physical configuration of an apparatus according to at least one example embodiment. In the example of FIG. 2C, apparatus 252 comprises a flexible display 254. It can be seen that display 254 is substantially non-bent. In this manner, display areas of display 254 are substantially aligned. In the example of FIG. 2C, the physical configuration of apparatus 252 may relate to a greater display physical configuration. For example, the physical configuration of apparatus 252 illustrated in FIG. 2C may provide a greater amount of viewable display area than the physical configuration of FIG. 2D. Apparatus 252 may determine that apparatus 252 has become configured in the greater display physical configuration based, at least in part, on determination that display 254 is substantially non-bent. In at least one example embodiment, the example of FIG. 2D illustrates a full display physical configuration of apparatus 252.

Figure 2D:
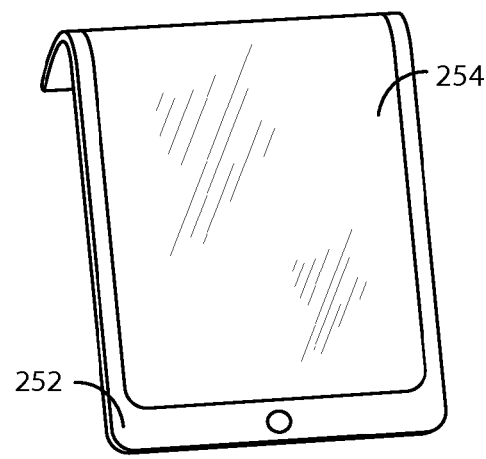

FIG. 2D is a diagram illustrating a physical configuration of an apparatus according to at least one example embodiment. In the example of FIG. 2D, it can be seen that display 254 is bent. In the example of FIG. 2D, display 254 is bent such that display 2D comprises a display area that faces in a direction and another display area that faces in a different direction. The other display area may be a non-viewable display area. It can be seen that the display area and the other display area are substantially non-aligned. In the example of FIG. 2D, the physical configuration of apparatus 252 may relate to a partial display physical configuration. For example, the physical configuration of apparatus 252 illustrated in FIG. 2D may provide a lesser amount of viewable display area than the physical configuration of FIG. 2C. Apparatus 252 may determine that apparatus 252 has become configured in the partial display physical configuration based, at least in part, on determination that the display area and the other display area are substantially non-aligned, for example by determining that display 254 is bent. In at least one example embodiment, part of display 254 that is bent may relate to a flexion of the display.

Figure 2E:
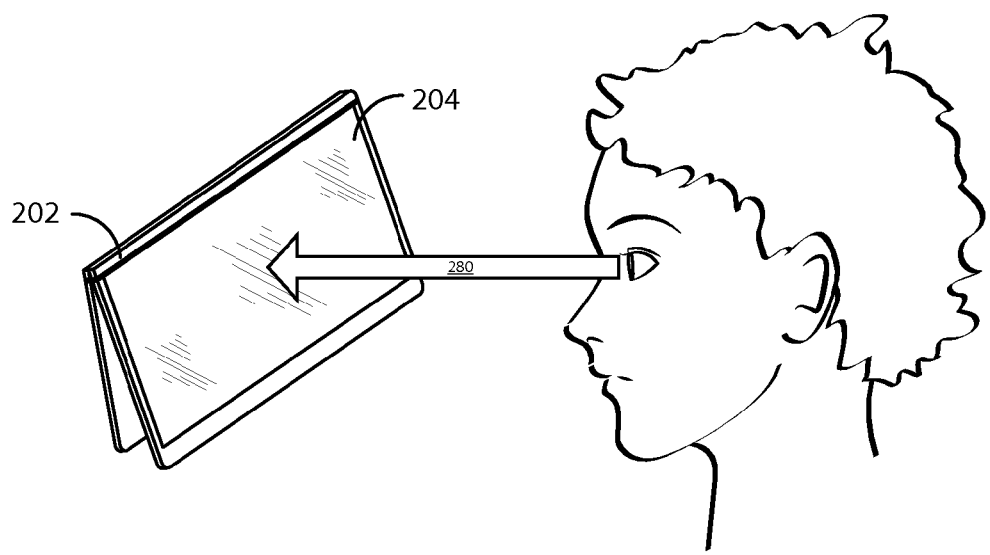

FIG. 2E is a diagram illustrating a physical configuration of an apparatus according to at least one example embodiment. The example of FIG. 2E illustrates a user viewing a display area of apparatus 202. It can be seen that display 204 of apparatus 202 is facing the user and that display 206 (not visible in FIG. 2E) is not facing the user. In at least one example embodiment, a display area that is obscured from the user relates to a display area that is not facing the user. For example, display 206 comprises a display area that is obscured from the user by, at least part of, apparatus 202. It can be seen that apparatus 202 is configured in a partial display physical configuration in the example of FIG. 2E. In this manner, the display area of display 204 relates to a part of the display that is facing the user in the partial display physical configuration. It can be seen that if apparatus 202 were configured in the greater display physical configuration of FIG. 2A, and display 204 would still face the user, that display 206 would also face the user.

In at least one example embodiment, a display area facing the user relates to the display being at a desirable viewing angle to the user. It can be seen that gaze 280 of the user is approximately ninety degrees. In at least one example embodiment, a desirable viewing angle relates to a viewing angle that is within a specified viewing angle for the display. For example, a display specification may comprise information indicative of a recommended viewing angle to the display.

FIGS. 3A-3D are diagrams illustrating program utilization of a display according to at least one example embodiment. The examples of FIGS. 3A-3D are merely examples of program utilization of a display, and do not limit the scope of the claims. For example, may vary, may vary, may vary, and/or the like.

In some circumstances, a user may desire to utilize a program on a larger display area that the current physical configuration of the apparatus provides. For example, when the apparatus is in a partial display physical configuration, the user may desire the program to operate in a display area associated with a greater display physical configuration. In some circumstances the user may desire to perform a simple and intuitive input that will cause the program to transition from operating in the viewable display area of the partial display physical configuration to the viewable display of the greater display physical configuration. For example, the user may desire to avoid performing an operation that causes the display area utilized by the program to include a previously non-viewable display area after the apparatus becomes configured in the greater display configuration. For example, the user may desire that the apparatus automatically causes the program to utilize a display area that becomes viewable by way of a transition to a greater display physical configuration upon the apparatus becoming configured in the greater display physical configuration. In this manner, the user may be able to avoid performing input after the greater display area becomes available to cause the program to utilize, at least part of, the greater display area.

In at least one example embodiment, the apparatus receives an indication of an input that identifies a program to operate in a greater display physical configuration associated with the currently viewable display area and another display area of the display. In such an example, the apparatus may cause the program to utilize, at least part of, the other display area when the apparatus determines that the apparatus has become configured in the greater display physical configuration. In at least one example embodiment, causation of the program to utilize at least part of the display area and at least part of the other display area is performed absent consideration of another input. For example, the apparatus may receive input subsequent to the apparatus becoming configured in the greater display physical configuration, but may cause the program to utilize at least part of the display area and at least part of the other display area with no dependency on the input. In at least one example embodiment, causation of the program to utilize at least part of the display area and at least part of the other display area is performed absent receipt of another input. For example, the apparatus may cause the program to utilize at least part of the display area and at least part of the other display area without receiving any input subsequent to the apparatus becoming configured in the greater display physical configuration.

In at least one example embodiment, the input may relate to a touch input, a pointer input, and/or the like. For example, the indication of the input may be received from a touch sensor, a motion sensor, a proximity sensor, a mouse, and/or the like. The indication of the input may relate to any information that conveys occurrence of the input, duration of the input, information identifying at least part of the input, and/or the like. The input may identify the program by way of corresponding to a position of a representation of the program. A representation of the program may relate to a tile indicative of the program, an icon indicative of the program, a window indicative of the program, and/or the like. For example, a touch input may identify the program by comprising a contact input that corresponds with location of the representation of the program. In another example, a mouse input may identify the program by comprising a selection input that corresponds with location of the representation of the program. In at least one example embodiment, the input is indicative of operating the program in the display area of the greater display physical configuration. For example, the input may be an input designated for operating the program in a greater display area than the current display area, operating the program with a specific display area that is currently non-viewable, and/or the like. In at least one example embodiment, the input relates to a drag input towards a flexion of the display in the partial display physical configuration. In this manner an input that drags a representation of the program towards the flexion point may be indicative of an input designated to cause the program to operate in the greater display area associated with the greater display physical configuration. In at least one example embodiment, a drag input relates to an input that comprises a selection input and a movement input. For example, the selection input may relate to a contact input, a button input, and/or the like. The movement input may relate to movement of a contact with a touch sensor, movement of a cursor, such as by a mouse, and/or the like. The drag input may terminate within a threshold distance from a flexion, at an edge of the display associated with a flexion, and/or the like.

Without limiting the scope of the claims in any way, at least one technical effect associated with the drag input towards the flexion being associated with causation of the program to operate in the greater display physical configuration may be to allow the user to easily understand that the input is identifying the other display region to be utilized by the program once the other display region becomes viewable.

In at least one example embodiment, the program relates to any program that may operate on the apparatus. In at least one example embodiment, the program may operate on the apparatus such that the program utilizes a specified display area. In at least one example embodiment, the program operating in a display area relates to the program utilizing the display area. In at least one example embodiment, the program utilizing the display area relates to the program interacting with the user by way of the display area, utilizing the display area to the exclusion of another program, and/or the like.

In at least one example embodiment, the input relates to selection of a non-interactive representation of the program. In such an example, the apparatus may launch the program based, at least in part, on the input. For example, the apparatus may launch the program upon receipt of the input, upon the apparatus becoming configured in the greater display physical configuration, and/or the like. In at least one example embodiment, the non-interactive representation of the program relates to an icon, a tile, and/or the like.

In at least one example embodiment, the apparatus may launch the program to utilize at least part of a display area relating to a viewable display area, without utilization of another display area, which relates to a non-viewable display area, while the apparatus is in the partial display physical configuration. In such an example, the apparatus may cause the program to utilize the display area and the other display area when the apparatus becomes configured in the greater display physical configuration.

In at least one example embodiment, causation of the program to utilize at least part of the display area and at least part of the other display area is performed absent consideration of another input. For example, the apparatus may receive input subsequent to the apparatus becoming configured in the greater display physical configuration, but may cause the program to utilize at least part of the display area and at least part of the other display area with no dependency on the input. In at least one example embodiment, causation of the program to utilize at least part of the display area and at least part of the other display area is performed absent receipt of another input. For example, the apparatus may cause the program to utilize at least part of the display area and at least part of the other display area without receiving any input subsequent to the apparatus becoming configured in the greater display physical configuration.

Without limiting the scope of the claims in any way, at least one technical effect associated with launching the program to utilize the display area and the other display area may be to allow the user to perform a single input to launch the program and utilize the display area and the other display area when they are both available. In this manner, the user may be able to perform fewer inputs than if the user launched the program and performed an additional input, after the apparatus is configured in the greater display physical configuration, to utilize the display area and the other display area.

Figure 3A:
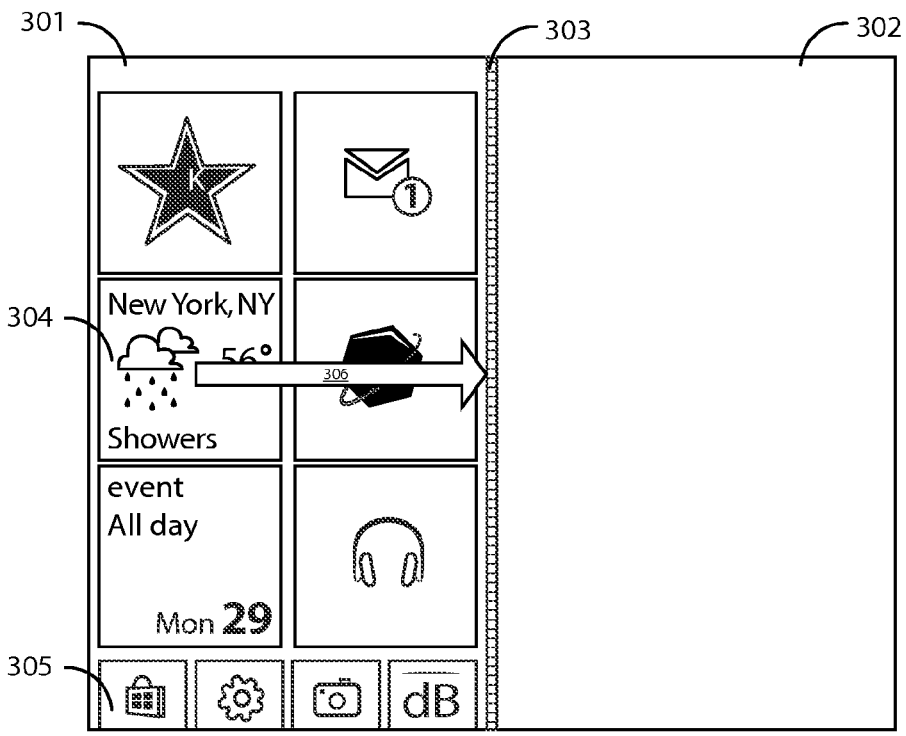
FIGS. 3A-3D are diagrams illustrating program utilization of a display according to at least one example embodiment.

FIG. 3A is a diagram illustrating input associated with program utilization of a display according to at least one example embodiment. The example of FIG. 3A illustrates display area 301 in relation to display area 302 and flexion 303. In the example of FIG. 3A, the apparatus is configured in a partial display physical configuration such that display area 302 is non-viewable. In at least one example embodiment, the apparatus disables display region 302 while display region 302 is non-viewable. In the example of FIG. 3A, display area 301 comprises non-interactive representations 304 and 305 that relate to different programs. Drag input 306 illustrates an input that identifies the program of non-interactive representation 304 to operate in a greater display physical configuration associated with display area 301 and display area 302 being viewable to the user. It can be seen that drag input 306 relates to selection of non-interactive representation 304 of the program. In at least one example embodiment, the apparatus may launch the program. For example, the apparatus may launch the program to operate in display area 301 and 302, as illustrated in FIG. 3D. In such an example, the apparatus may launch the program when the apparatus becomes configured in the greater display physical configuration. In another example, the apparatus may launch the program to operate in display area 301 until the apparatus becomes configured in the greater display physical configuration. In such an example, the apparatus may cause the program to operate in display area 301 and 302, as illustrated in FIG. 3D when the apparatus becomes configured in the greater display physical configuration.

Figure 3B:
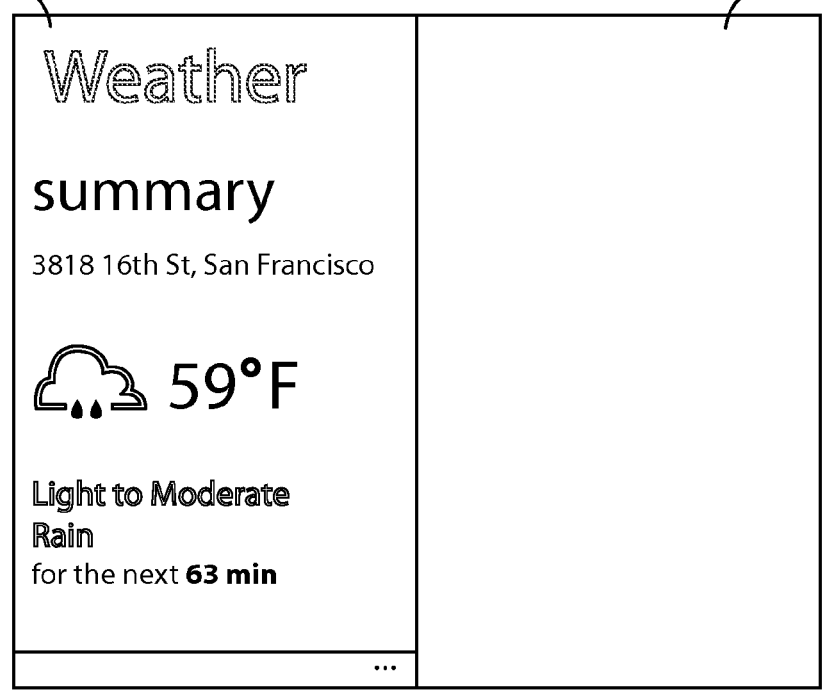

FIG. 3B is a diagram illustrating input associated with program utilization of a display according to at least one example embodiment. The example of FIG. 3B illustrates a program utilizing display area 301 without display area 302. In at least one example embodiment, the apparatus utilizes display area 301 without display area 302 when the apparatus is configured in a partial display physical configuration in which display area 302 is non-viewable. In at least one example embodiment, the apparatus utilizes display area 301 without display area 302 when the apparatus becomes configured in a greater display physical configuration in circumstances where the apparatus did not receive an input that identifies the program to operate in the greater display physical configuration. In such an example, absent an input that identifies the program to operate in the greater display physical configuration, the apparatus may cause the program to utilize display area 301 without display area 302 based, at least in part, on the lack of such an input. In this manner, the apparatus may cause the program to utilize display area 301 without display area 302 without regard for determination that the apparatus has become configured in the greater display physical configuration.

In some circumstances, the program may be operating in a partial display physical configuration absent a previous input that identifies the program to operate in the greater display physical configuration. For example, the program may have been launched with an input that did not identify the program to operate in the greater display physical configuration. In such an example, the apparatus may receive an input that identifies the program to operate in the greater display physical configuration while the program is operating. In such an example, the apparatus may cause the program to operate in display area 301 and 302, as illustrated in FIG. 3D when the apparatus becomes configured in the greater display physical configuration.

Even though the example of FIG. 3B illustrates the program utilizing the entirety of display area 301, the program may utilize a part of display area 301 that is less than the entirety of display area 301.

Figure 3C:
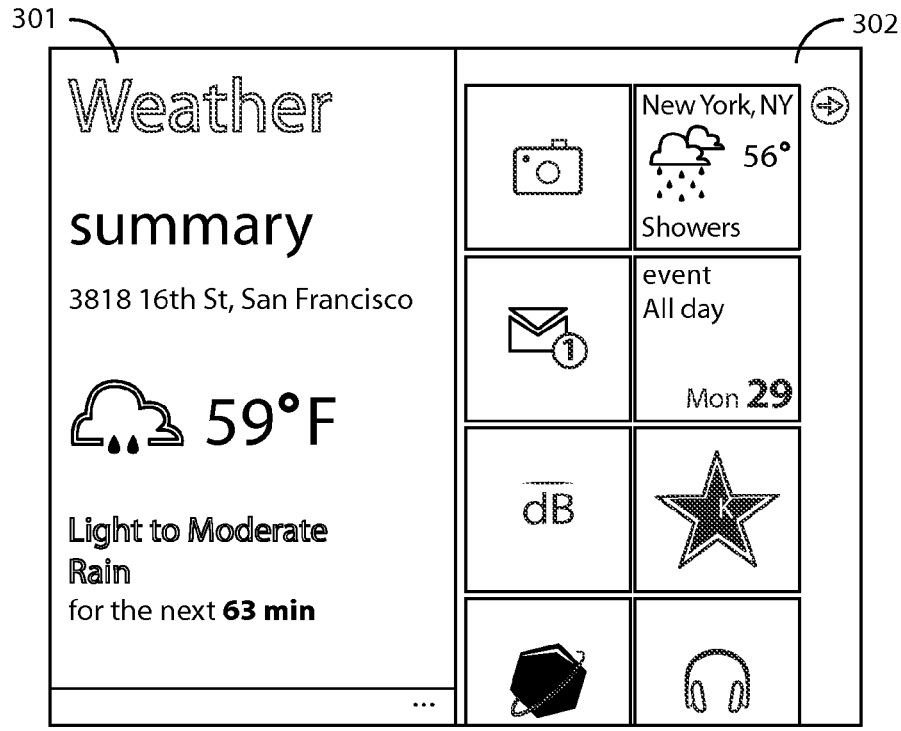
Figure 3D:
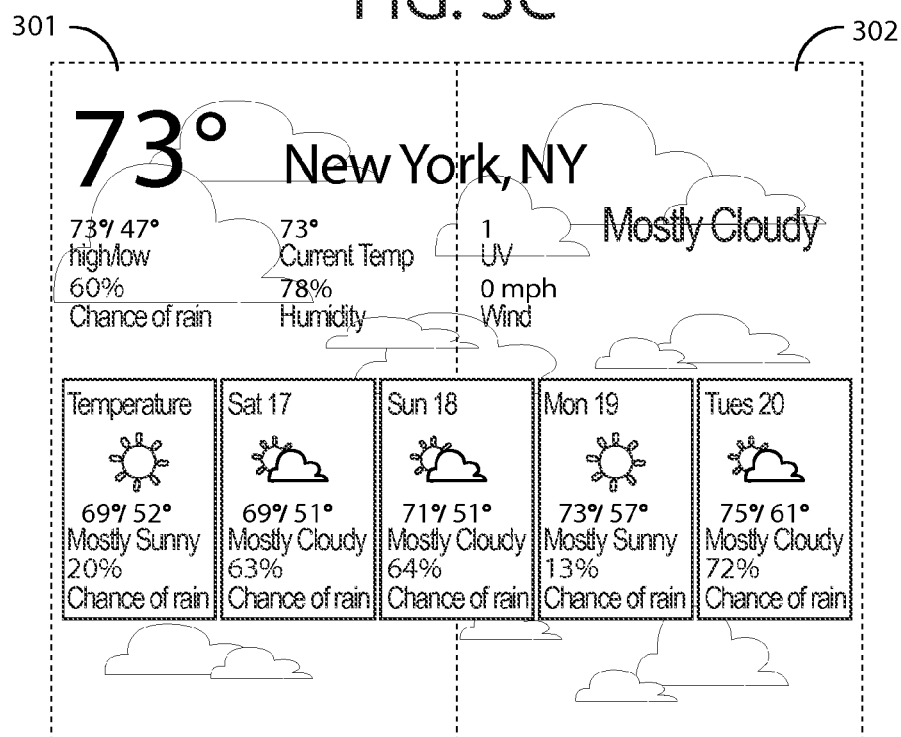

FIG. 3C is a diagram illustrating input associated with program utilization of a display according to at least one example embodiment. The example of FIG. 3C illustrates a program utilizing display area 301 without display area 302. In the example of FIG. 3C, the apparatus is utilizing display area 302 for a different program. In the example of FIG. 3C, the apparatus may be in a greater display physical configuration. In at least one example embodiment, the apparatus utilizes display area 301 without display area 302 when the apparatus becomes configured in a greater display physical configuration in circumstances where the apparatus did not receive an input that identifies the program to operate in the greater display physical configuration. In such an example, absent an input that identifies the program to operate in the greater display physical configuration, the apparatus may cause the program to utilize display area 301 without display area 302 based, at least in part, on the lack of such an input. In this manner, the apparatus may cause the program to utilize display area 301 without display area 302 without regard for determination that the apparatus has become configured in the greater display physical configuration. In such an example, other programs may utilize display area 302. In some circumstances, there may be an input that causes the apparatus to cause the program to utilize display area 301 and display area 302. Such an input may differ from the input that identifies the program to operate in the greater display physical configuration.

FIG. 3D is a diagram illustrating input associated with program utilization of a display according to at least one example embodiment. The example of FIG. 3D illustrates a program that utilizes display area 301 and display area 302. In at least one example embodiment, the example of FIG. 3D relates to the apparatus being configured in a greater display physical configuration. Even though the example of FIG. 3B illustrates the program utilizing the entirety of display areas 301 and 302, the program may utilize a part of display area 301 that is less than the entirety of display area 301 and/or part of display area 302 that is less than the entirety of display area 302.

Figure 4:
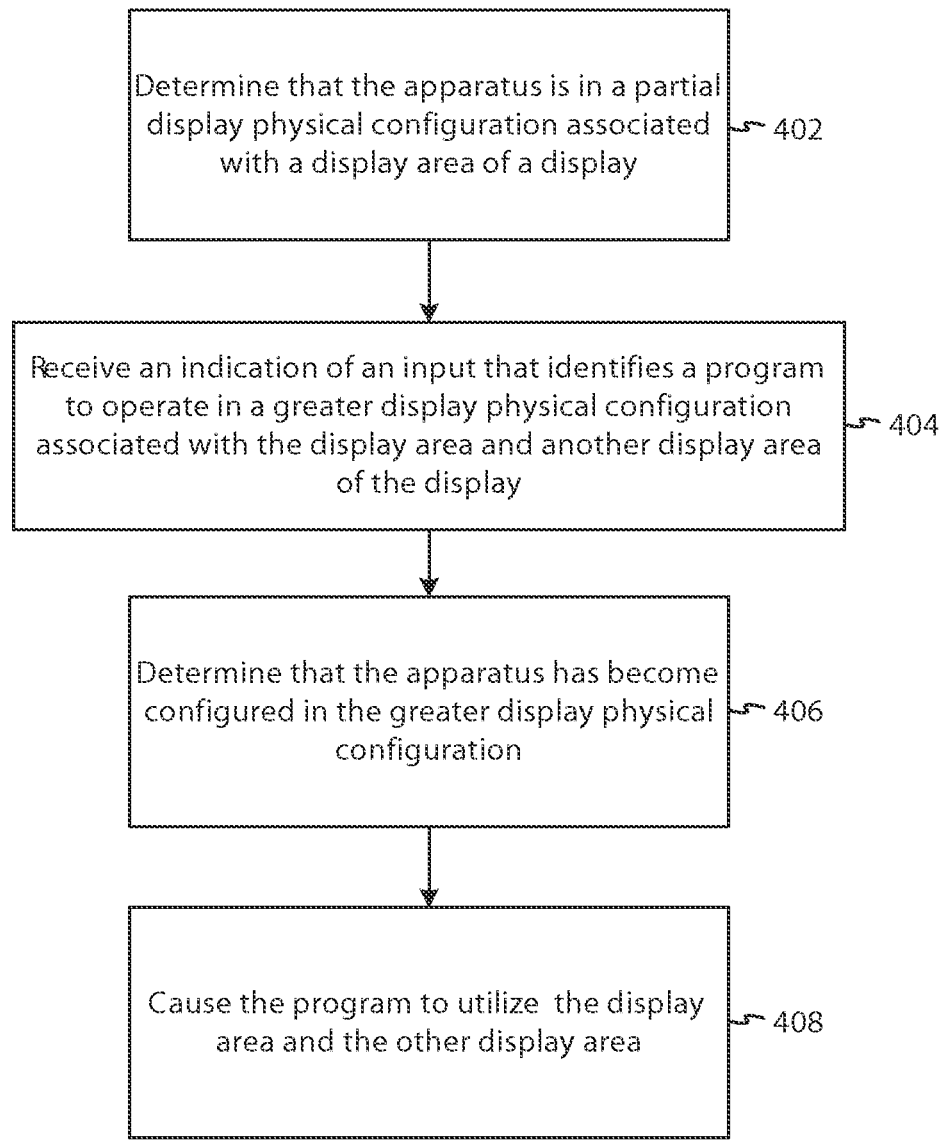
FIG. 4 is a flow diagram illustrating activities associated with causation of a program to utilize display areas according to at least one example embodiment.

FIG. 4 is a flow diagram illustrating activities associated with causation of a program to utilize display areas according to at least one example embodiment. In at least one example embodiment, there is a set of operations that corresponds the activities of FIG. 4. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 4.

At block 402, the apparatus determines that the apparatus is in a partial display physical configuration associated with a display area of a display being viewable to a user. The determination, the partial display physical configuration, the display area, the display, and viewability may be similar as described regarding FIGS. 2A-2E.

At block 404, the apparatus receives an indication of an input that identifies a program to operate in a greater display physical configuration associated with the display area and another display area of the display being viewable to the user. The receipt, the indication, the input, the identification, the program, the greater display physical configuration, and the other display area may be similar as described regarding FIGS. 2A-2E, FIGS. 3A-3D, and/or the like.

At block 406, the apparatus determines that the apparatus has become configured in the greater display physical configuration. The determination may be similar as described regarding FIGS. 2A-2E.

Figure 5:
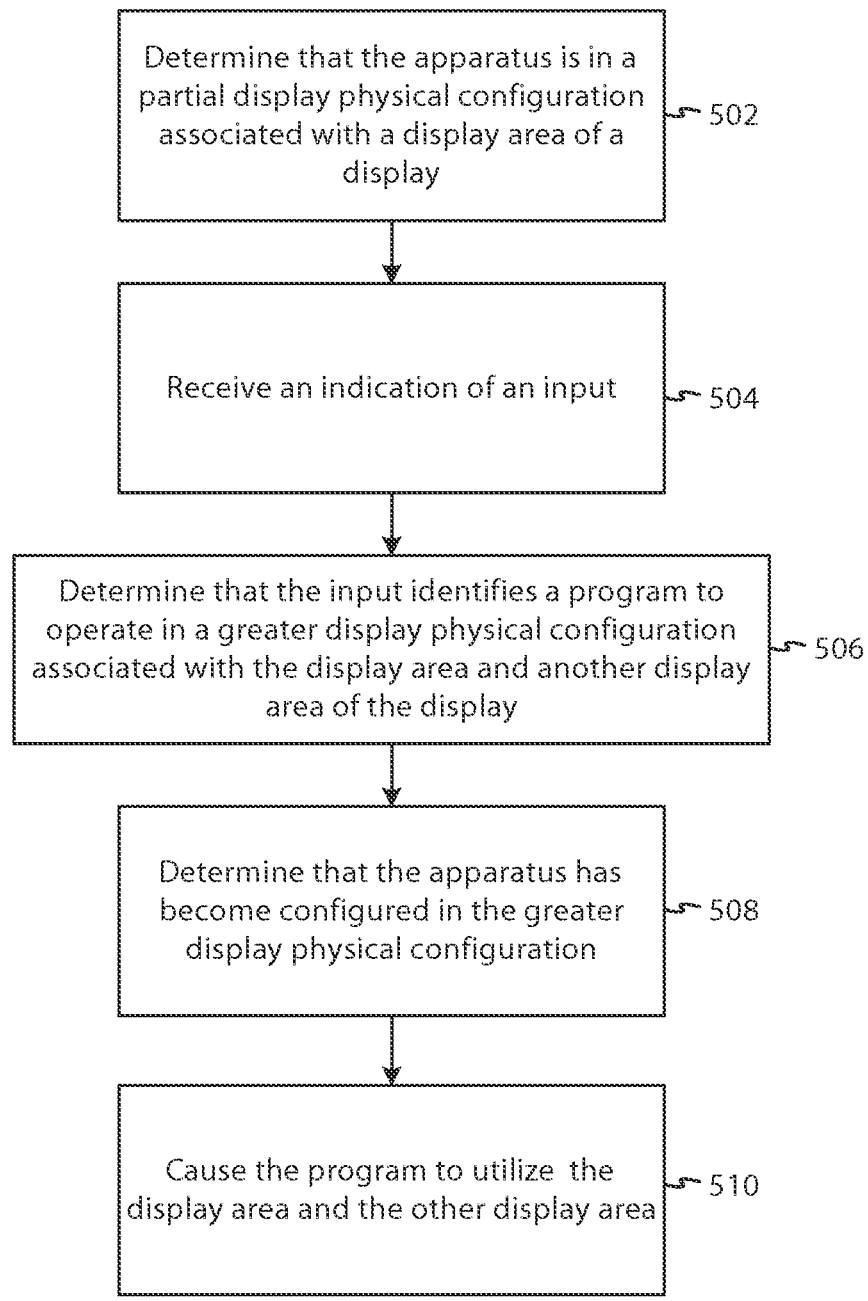
FIG. 5 is a flow diagram illustrating activities associated with causation of a program to utilize display areas according to at least one example embodiment.

At block 408, the apparatus causes the program to utilize at least part of the display area and at least part of the other display area. The causation and the utilization may be similar as described regarding FIGS. 3A-3D. In this manner, the apparatus may cause the program to utilize at least part of the display area and at least part of the other display area based, at least in part, on the input and the determination that the apparatus has become configured in the greater display configuration FIG. 5 is a flow diagram illustrating activities associated with causation of a program to utilize display areas according to at least one example embodiment. In at least one example embodiment, there is a set of operations that corresponds the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

In some circumstances, there may be more than one input associated with interaction with a program. For example, there may be an input associated with launching a program such that the program utilizes a currently viewable display area. In at least one example embodiment, the apparatus bases causation of the program to utilize at least part of the display area and at least part of the other display area on a determination that a received input identifies the program to operate in the greater display physical configuration.

At block 502, the apparatus determines that the apparatus is in a partial display physical configuration associated with a display area of a display being viewable to a user, similarly as described regarding block 402 of FIG. 4.

At block 504, the apparatus receives an indication of an input. The receipt, the indication, and the input may be similar as described regarding FIGS. 3A-3D.

At block 506, the apparatus determines that the input identifies the program to operate in the greater display physical configuration. The determination, the identification, the program, the greater display physical configuration, and the other display area may be similar as described regarding FIGS. 2A-2E, FIGS. 3A-3D, and/or the like.

At block 508, the apparatus determines that the apparatus has become configured in the greater display physical configuration, similarly as described regarding block 406 of FIG. 4.

At block 510, the apparatus causes the program to utilize at least part of the display area and at least part of the other display area, similarly as described regarding block 408 of FIG. 4. In this manner, the apparatus may cause the program to utilize at least part of the display area and at least part of the other display area based, at least in part on, determination that the input identifies the program to operate in the greater display physical configuration. In at least one example embodiment, the apparatus predicates causation of the program to utilize at least part of the display area and at least part of the other display area on determination that the input identifies the program to operate in the greater display physical configuration.

Figure 6:
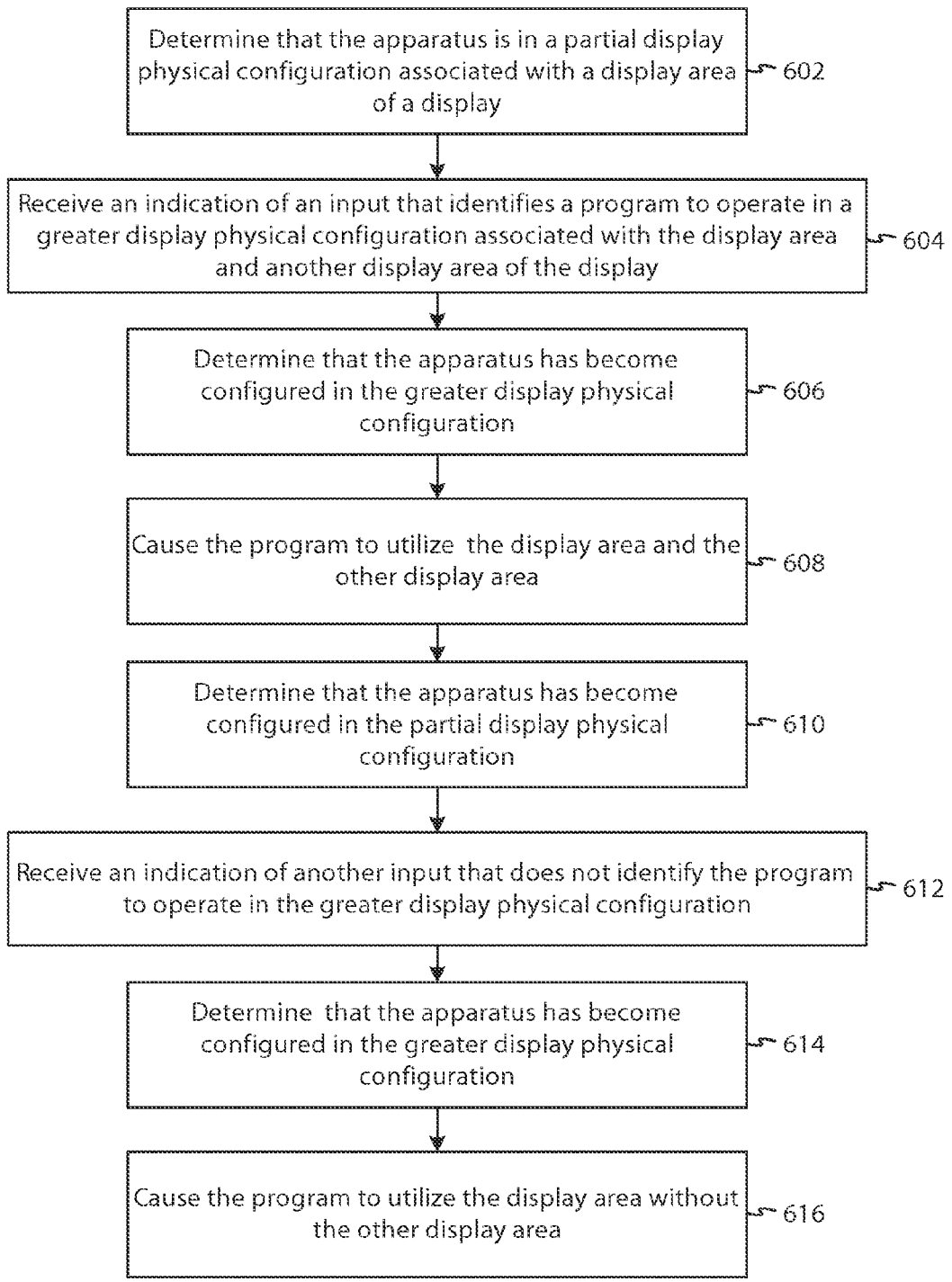
FIG. 6 is a flow diagram illustrating activities associated with causation of a program to utilize display areas according to at least one example embodiment.

FIG. 6 is a flow diagram illustrating activities associated with causation of a program to utilize display areas according to at least one example embodiment. In at least one example embodiment, there is a set of operations that corresponds the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus determines that the apparatus is in a partial display physical configuration associated with a display area of a display being viewable to a user, similarly as described regarding block 402 of FIG. 4.

At block 604, the apparatus receives an indication of an input that identifies a program to operate in a greater display physical configuration associated with the display area and another display area of the display being viewable to the user, similarly as described regarding block 404 of FIG. 4.

At block 606, the apparatus determines that the apparatus has become configured in the greater display physical configuration, similarly as described regarding block 406 of FIG. 4.

At block 608, the apparatus causes the program to utilize at least part of the display area and at least part of the other display area, similarly as described regarding block 408 of FIG. 4.

At block 610, the apparatus determines that the apparatus has become configured in a partial display physical configuration associated with a display area of a display being viewable to a user. The determination, the partial display physical configuration, the display area, the display, and viewability may be similar as described regarding FIGS. 2A-2E.

At block 612, the apparatus receives an indication of another input that does not identify the program to operate in the greater display physical configuration. The receipt, the indication, the input, the identification, the program, the greater display physical configuration, and the other display area may be similar as described regarding FIGS. 2A-2E, FIGS. 3A-3D, and/or the like.

At block 614, the apparatus determines that the apparatus has become configured in the greater display physical configuration, similarly as described regarding block 406 of FIG. 4.

At block 616, the apparatus causes, at least temporarily, the program to utilize the display area without the other display area based, at least in part, on the other input. The causation and the utilization may be similar as described regarding FIGS. 3A-3D.

Figure 7:
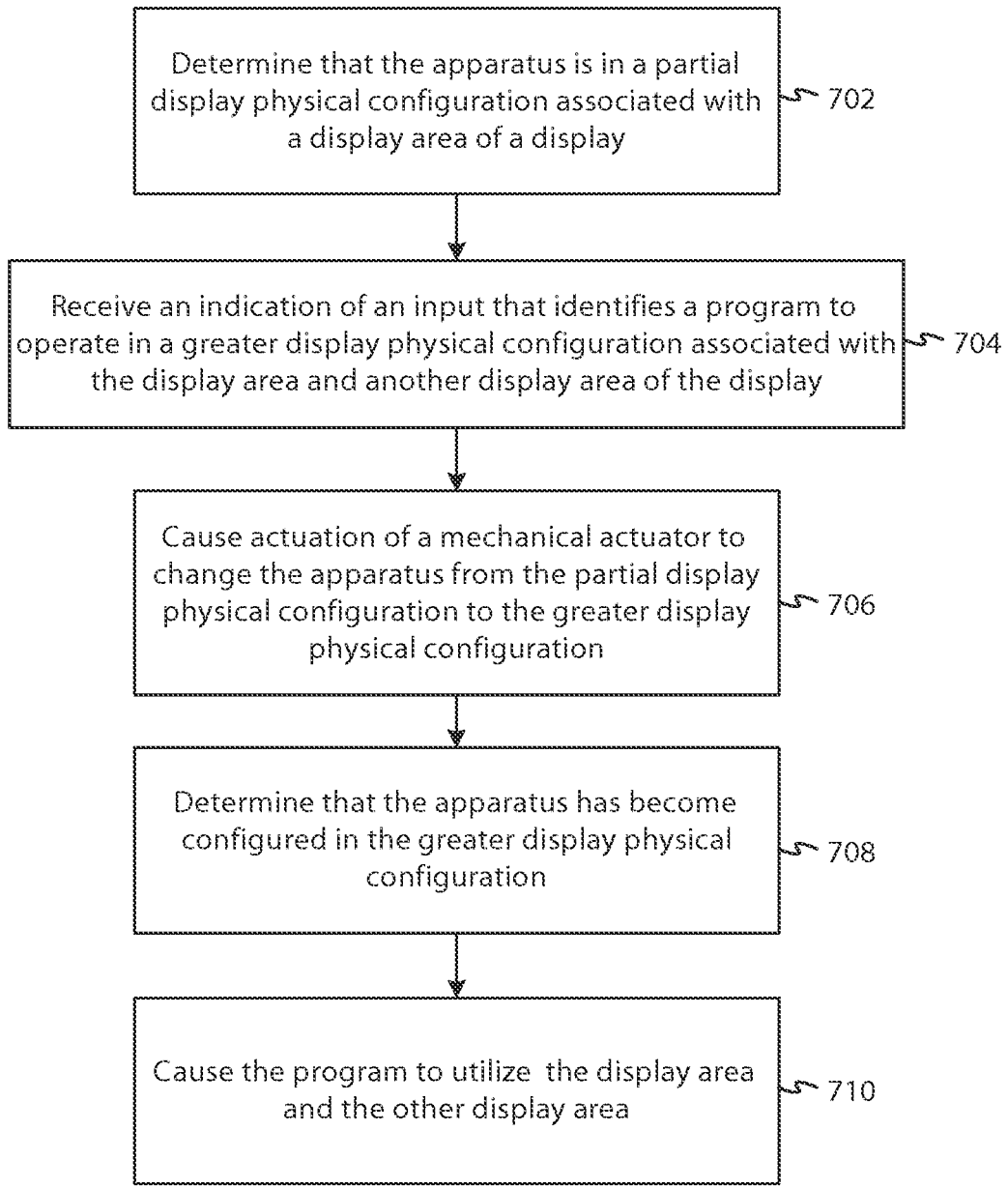
FIG. 7 is a flow diagram illustrating activities associated with causation of a program to utilize display areas according to at least one example embodiment.

FIG. 7 is a flow diagram illustrating activities associated with causation of a program to utilize display areas according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines that the apparatus is in a partial display physical configuration associated with a display area of a display being viewable to a user, similarly as described regarding block 402 of FIG. 4.

At block 704, the apparatus receives an indication of an input that identifies a program to operate in a greater display physical configuration associated with the display area and another display area of the display being viewable to the user, similarly as described regarding block 404 of FIG. 4.

At block 706, the apparatus causes actuation of a mechanical actuator to change the apparatus from the partial display physical configuration to the greater display physical configuration. The causation, the actuation, the mechanical actuator, and the change may be similar as described regarding FIGS. 2A-2E. In this manner, causation of actuation of the mechanical actuator to change the apparatus from the partial display physical configuration to the greater display physical configuration may be based, at least in part, on the input. In at least one example embodiment, causation of actuation of the mechanical actuator to change the apparatus from the partial display physical configuration to the greater display physical configuration predicated on the input.

In at least one example embodiment, causation of the actuation is performed absent consideration of another input. For example, the apparatus may receive another input subsequent to the input, but may cause the actuation with no dependency on the input. In at least one example embodiment, causation of actuation is performed absent receipt of another input. For example, the apparatus may cause the actuation without receiving any other input subsequent to the input.

At block 708, the apparatus determines that the apparatus has become configured in the greater display physical configuration, similarly as described regarding block 406 of FIG. 4.

At block 710, the apparatus causes the program to utilize at least part of the display area and at least part of the other display area, similarly as described regarding block 408 of FIG. 4.

Figure 8:
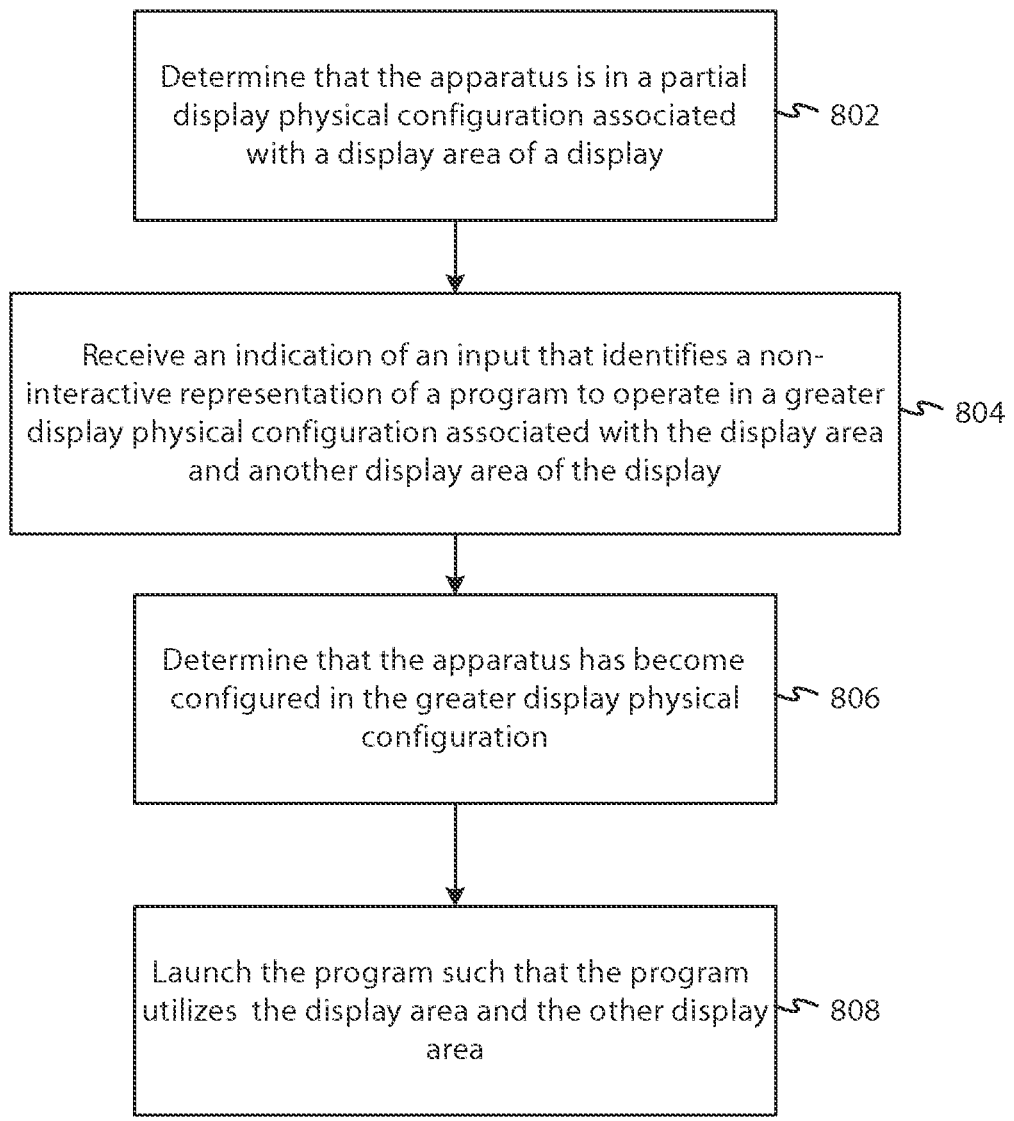
FIG. 8 is a flow diagram illustrating activities associated with causation of a program to utilize display areas according to at least one example embodiment.

FIG. 8 is a flow diagram illustrating activities associated with causation of a program to utilize display areas according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus determines that the apparatus is in a partial display physical configuration associated with a display area of a display being viewable to a user, similarly as described regarding block 402 of FIG. 4.

At block 804, the apparatus receives an indication of an input that identifies a non-interactive representation of a program to operate in a greater display physical configuration associated with the display area and another display area of the display being viewable to the user. The receipt, the indication, the input, the identification, the non-interactive representation, the program, the greater display physical configuration, and the other display area may be similar as described regarding FIGS. 2A-2E, FIGS. 3A-3D, and/or the like.

At block 806, the apparatus determines that the apparatus has become configured in the greater display physical configuration, similarly as described regarding block 406 of FIG. 4.

At block 808, the apparatus launches the program such that the program utilizes at least part of the display area and at least part of the other display area. The causation and the utilization may be similar as described regarding FIGS. 3A-3D. In this manner, launch of the program may be based, at least in part, on the input and the determination that the apparatus has become configured in the greater display physical configuration. In at least one example embodiment, launch of the program is predicated by the input and the determination that the apparatus has become configured in the greater display physical configuration.

In at least one example embodiment, causation of the launch of the program is performed absent consideration of another input. For example, the apparatus may receive another input subsequent to the input, but may cause the launch of the program with no dependency on the input. In at least one example embodiment, causation of actuation is performed absent receipt of another input. For example, the apparatus may cause the launch of the program without receiving any other input subsequent to the input.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 506 of FIG. 5 may be performed after block 508. Furthermore, if desired, one or more of the above-described functions may be optional or may be combined. For example, block 506 of FIG. 5 may be optional and/or combined with block 508 of FIG. 5.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
at least one processor;
at least one memory including computer program code, the memory and the computer program code configured to, working with the processor, cause the apparatus to perform at least the following:
receiving an indication of an input that identifies a program to launch in a greater display physical configuration associated with a display area and another display area of a display being viewable to a user;
determining that the apparatus is in a partial display physical configuration associated with the display area of the display being viewable to the user;
determining that the apparatus has become configured in the greater display physical configuration;
launching the program in response to the input and the determination that the apparatus has become configured in the greater display physical configuration; and
causing the program to utilize at least part of the display area and at least part of the other display area based, at least in part, on the input and the determination that the apparatus has become configured in the greater display configuration.

2. The apparatus of claim 1, wherein the input relates to a drag input towards a flexion of the display in the partial display physical configuration.

3. The apparatus of claim 1, wherein the memory and the computer program code are further configured to, working with the processor, cause the apparatus to further perform determining that the input identifies the program to launch in the greater display physical configuration.

4. The apparatus of claim 1, wherein the memory and the computer program code are further configured to, working with the processor, cause the apparatus to further perform:
determining that the apparatus has become configured in the partial display physical configuration;
receiving an indication of another input that does not identify the program to launch in the greater display physical configuration;
determining that the apparatus has become configured in the greater display physical configuration; and
causing, at least temporarily, the program to utilize the display area without the other display area based, at least in part, on the other input.

5. The apparatus of claim 1, wherein causation of the program to utilize at least part of the display area and at least part of the other display area is performed absent receipt of another input.

6. The apparatus of claim 1, wherein the apparatus comprises a mechanical actuator configured to cause the apparatus to change physical configuration from the partial display physical configuration to the greater display physical configuration.

7. The apparatus of claim 6, wherein the memory and the computer program code are further configured to, working with the processor, cause the apparatus to further perform causing actuation of the mechanical actuator to change the apparatus from the partial display physical configuration to the greater display physical configuration.

8. The apparatus of claim 1, wherein the input relates to selection of a non-interactive representation of the program.

9. The apparatus of claim 1, wherein the apparatus is a mobile phone.

10. A method comprising: receiving an indication of an input that identifies a program to launch in a greater display physical configuration associated with a display area and another display area of a display being viewable to a user;

determining that an apparatus is in a partial display physical configuration associated with the display area of the display being viewable to the user;

determining that the apparatus has become configured in the greater display physical configuration;

launching the program in response to the input and the determination that the apparatus has become configured in the greater display physical configuration; and causing the program to utilize at least part of the display area and at least part of the other display area based, at least in part, on the input and the determination that the apparatus has become configured in the greater display configuration.

11. The method of claim 10, wherein the input relates to a drag input towards a flexion of the display in the partial display physical configuration.

12. The method of claim 10, further comprising determining that the input identifies the program to launch in the greater display physical configuration.

13. The method of claim 10, further comprising:
determining that the apparatus has become configured in the partial display physical configuration;
receiving an indication of another input that does not identify the program to launch in the greater display physical configuration;
determining that the apparatus has become configured in the greater display physical configuration; and
causing, at least temporarily, the program to utilize the display area without the other display area based, at least in part, on the other input.

14. The method of claim 10, wherein causation of the program to utilize at least part of the display area and at least part of the other display area is performed absent receipt of another input.

15. The method of claim 10, wherein the apparatus comprises a mechanical actuator configured to cause the apparatus to change physical configuration from the partial display physical configuration to the greater display physical configuration.

16. The method of claim 15, further comprising causing actuation of the mechanical actuator to change the apparatus from the partial display physical configuration to the greater display physical configuration.

17. At least one non-transitory computer-readable medium encoded with instructions that, when executed by a processor, perform:
receiving an indication of an input that identifies a program to launch in a greater display physical configuration associated with a display area and another display area of a display being viewable to a user;
determining that an apparatus is in a partial display physical configuration associated with the display area of the display being viewable to the user;
determining that the apparatus has become configured in the greater display physical configuration;
launching the program in response to the input and the determination that the apparatus has become configured in the greater display physical configuration; and
causing the program to utilize at least part of the display area and at least part of the other display area based, at least in part, on the input and the determination that the apparatus has become configured in the greater display configuration.

18. The non-transitory computer-readable medium of claim 17, wherein the input relates to a drag input towards a flexion of the display in the partial display physical configuration.

19. The non-transitory computer-readable medium of claim 17, wherein the medium is further encoded with instructions that, when executed by the processor, perform determining that the input identifies the program to launch in the greater display physical configuration.

20. The non-transitory computer-readable medium of claim 17, wherein the medium is further encoded with instructions that, when executed by the processor, perform:
determining that the apparatus has become configured in the partial display physical configuration;
receiving an indication of another input that does not identify the program to launch in the greater display physical configuration;
determining that the apparatus has become configured in the greater display physical configuration; and
causing, at least temporarily, the program to utilize the display area without the other display area based, at least in part, on the other input.

* * * * *

UNITED STATES PATENT AND TRADEMARK OFFICE
CERTIFICATE OF CORRECTION

PATENT NO.       : 9,240,158 B2
APPLICATION NO.  : 13/903964
DATED            : January 19, 2016
INVENTOR(S)      : Catalin Gheorghiu Page 1 of 1

It is certified that error appears in the above-identified patent and that said Letters Patent is hereby corrected as shown below:

On the title page item (56) Column 2, under Other Publications
Delete "PCT/F12014/050339" and replace with -- PCT/FI2014/050339 --

Signed and Sealed this
Fourteenth Day of June, 2016

Michelle K. Lee
*Director of the United States Patent and Trademark Office*